United States Patent
Lee et al.

(10) Patent No.: US 12,355,035 B2
(45) Date of Patent: Jul. 8, 2025

(54) SECONDARY BATTERY AND METHOD FOR MANUFACTURING THE SAME

(71) Applicant: LG Energy Solution, Ltd., Seoul (KR)

(72) Inventors: Chung Hee Lee, Daejeon (KR); Ji Soo Park, Daejeon (KR); Dong Hyeuk Park, Daejeon (KR); Se Hyun Yoon, Daejeon (KR); Su Ho Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 671 days.

(21) Appl. No.: 17/625,011

(22) PCT Filed: May 13, 2020

(86) PCT No.: PCT/KR2020/006303
§ 371 (c)(1),
(2) Date: Jan. 5, 2022

(87) PCT Pub. No.: WO2021/006474
PCT Pub. Date: Jan. 14, 2021

(65) Prior Publication Data
US 2022/0285735 A1 Sep. 8, 2022

(30) Foreign Application Priority Data
Jul. 8, 2019 (KR) .......... 10-2019-0082273

(51) Int. Cl.
*H01M 50/54* (2021.01)
*H01M 10/0585* (2010.01)
*H01M 50/531* (2021.01)

(52) U.S. Cl.
CPC ..... *H01M 10/0585* (2013.01); *H01M 50/531* (2021.01)

(58) Field of Classification Search
CPC ................................. H01M 10/0585
See application file for complete search history.

(56) References Cited

U.S. PATENT DOCUMENTS

| 2006/0093910 A1 | 5/2006 | Yoon et al. |
| 2011/0064991 A1 | 3/2011 | Ahn |

(Continued)

FOREIGN PATENT DOCUMENTS

| CN | 102054957 A | 5/2011 |
| CN | 102969532 A | 3/2013 |

(Continued)

OTHER PUBLICATIONS

Machine translation of JP 2018113190 A from Espacenet (Year: 2018).*

(Continued)

*Primary Examiner* — Nicholas A Smith
*Assistant Examiner* — Zackary Richard Cochenour
(74) *Attorney, Agent, or Firm* — Lerner David LLP

(57) ABSTRACT

The present invention relates to a method for manufacturing a secondary battery. The method for manufacturing the secondary battery comprises: an electrode preparation step of preparing electrodes, each of which is provided with a coating portion coated with an electrode active material and a non-coating portion that is not coated with the electrode active material; an electrode assembly manufacturing step of alternately stacking the electrodes and separators to manufacture an electrode assembly, wherein the electrodes are stacked so that the non-coating portions overlap each other; a non-coating portion bonding step of bonding the non-coating portions to each other; a display part formation step of forming a display part for setting a cutting point on a surface of the bonded non-coating portion of each of the electrodes; and an electrode tab manufacturing step of cutting the bonded non-coating portion adjacent to the display part to manufacture an electrode tab.

11 Claims, 15 Drawing Sheets

(56) References Cited

U.S. PATENT DOCUMENTS

| | | | |
|---|---|---|---|
| 2011/0104541 A1 | 5/2011 | Ahn et al. | |
| 2011/0123857 A1 | 5/2011 | Hwang et al. | |
| 2011/0129701 A1 | 6/2011 | Seo | |
| 2011/0151318 A1 | 6/2011 | Lee et al. | |
| 2011/0244287 A1* | 10/2011 | Kim | H01M 50/55 29/623.2 |
| 2013/0054061 A1 | 2/2013 | Nishimoto | |
| 2013/0260211 A1 | 10/2013 | Min et al. | |
| 2014/0162114 A1* | 6/2014 | Suzuki | H01M 10/6555 429/163 |
| 2015/0118570 A1 | 4/2015 | Nishimoto | |
| 2016/0133916 A1 | 5/2016 | Zagars et al. | |
| 2016/0260948 A1 | 9/2016 | Nishimoto | |
| 2020/0185690 A1 | 6/2020 | Kim et al. | |
| 2020/0321597 A1 | 10/2020 | Zagars et al. | |
| 2021/0167351 A1 | 6/2021 | Zagars et al. | |

FOREIGN PATENT DOCUMENTS

| | | | |
|---|---|---|---|
| CN | 107112444 A | | 8/2017 |
| CN | 110326130 A | | 10/2019 |
| JP | 2009123583 A | | 6/2009 |
| JP | 2012014870 A | * | 1/2012 |
| JP | 2014026867 A | * | 2/2014 |
| JP | 2015106434 A | | 6/2015 |
| JP | 2016100282 A | | 5/2016 |
| JP | 2017533548 A | | 11/2017 |
| JP | 2018113190 A | * | 7/2018 |
| JP | 2018152239 A | | 9/2018 |
| JP | 2019061925 A | | 4/2019 |
| JP | 2019102196 A | | 6/2019 |
| KR | 20060037594 A | | 5/2006 |
| KR | 20110058658 A | | 6/2011 |
| KR | 20110060036 A | | 6/2011 |
| KR | 101137364 B1 | | 4/2012 |
| KR | 20120060700 A | | 6/2012 |
| KR | 101182901 B1 | | 9/2012 |
| KR | 20150003483 A | | 1/2015 |
| KR | 20160010080 A | | 1/2016 |
| KR | 101658973 B1 | | 9/2016 |
| KR | 20170052302 A | | 5/2017 |
| KR | 20180013378 A | | 2/2018 |
| KR | 20180097243 A | * | 8/2018 |

OTHER PUBLICATIONS

Machine translation of JP2012014870A from espacenet (Year: 2012).*
Machine translation of JP 2014026867 from espacenet (Year: 2014).*
Machine translation of KR 20180097243 A from PE2E (Year: 2018).*
Search Report dated Jan. 26, 2024 from Office Action for Chinese Application No. 202080042028.5 issued Jan. 27, 2024. 2 pgs.
Extended European Search Report including Written Opinion for Application No. 20836539.5 dated Oct. 25, 2022, pp. 1-5.
International Search Report for PCT/KR2020/006303 dated Aug. 21, 2020. 2 pgs.

* cited by examiner

SECONDARY BATTERY AND METHOD FOR MANUFACTURING THE SAME

CROSS-REFERENCE TO RELATED APPLICATION

The present application is a national stage entry under 35 U.S.C. § 371 of International Application No. PCT/KR2020/006303, filed on May 13, 2020, published in Korean, which claims priority to Korean Patent Application No. 10-2019-0082273, filed on Jul. 8, 2019, the entire contents of which are hereby incorporated herein by reference.

TECHNICAL FIELD

The present invention relates to a secondary battery and a method for manufacturing the same, and more particularly, to a secondary battery, in which a notching step is removed to simplify processes, and a method for manufacturing the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary battery comprises an electrode assembly in which electrodes and separators are alternately stacked and a case accommodating the electrode assembly. A method for manufacturing the secondary battery having the above-described above structure comprises a step of manufacturing an electrode, a step of manufacturing an electrode assembly, and a step of accommodating the electrode assembly in a case.

Here, the method for manufacturing the secondary battery comprises a notching process for forming a tab in the step of manufacturing the electrode.

However, the method for manufacturing the secondary battery according to the present invention has a problem in which a lot of time is taken to manufacture the electrode due to the notching process, and particularly, many defects occur due to burrs and delamination that occur during the notching process.

DISCLOSURE OF THE INVENTION

Technical Problem

The present invention is invented to solve the above problems, and an object of the present invention is to provide a secondary battery, in which a notching process of processing an electrode tab is removed to simplify processes, thereby significantly reducing a time taken to manufacture the secondary battery, and particularly, significantly reducing a defect rate by preventing burrs and delamination that occur during the notching process, and a method for manufacturing the secondary battery.

Technical Solution

A method for manufacturing a secondary battery according to the present invention for achieving the above object comprises: an electrode preparation step (S10) of preparing electrodes, each of which is provided with a coating portion coated with an electrode active material and a non-coating portion that is not coated with the electrode active material; an electrode assembly manufacturing step (S20) of alternately stacking the electrodes and separators to manufacture an electrode assembly, wherein the electrodes are stacked so that the non-coating portions overlap each other; a non-coating portion bonding step (S30) of bonding the overlapping non-coating portions to each other; a display part formation step (S40) of forming a display part for setting a cutting point on a surface of the bonded non-coating portion; and an electrode tab manufacturing step (S50) of cutting the bonded non-coating portion with respect to the display part to manufacture an electrode tab.

The display part formation process (S40) may comprise: a photographing process of photographing the surface of the overlapping non-coating portions; an inspection process of inspecting whether the photographed image of the non-coating portions is within a set range of a previously input image of the non-coating portions; and a display process of forming a display part for setting the cutting point on the surface of the overlapping non-coating portions when the image of the non-coating portions, which is photographed in the inspection process, is within the set range of the previously input image of the non-coating portions.

In the display process, a display part for setting the cutting point may be formed on each of both vertex portions on the surface of the overlapping non-coating portions, and in the electrode tab manufacturing step (S50), both the vertex portions of the overlapping non-coating portions may be cut to be inclined with respect to the display part to manufacture the electrode tab.

The display part may be formed as a display hole passing from a top surface to a bottom surface of the overlapping non-coating portions.

Each of the non-coating portions may comprise a connection surface connected to the coating portion and a bonding surface extending from the connection surface, in the non-coating bonding step (S30), the overlapping non-coating portions may be bonded to each other through the bonding surface, in the display process, the bonding surface may be divided into an uncut part connected to the connection surface and a cut part extending from the uncut part, and the display part for setting the cutting point may be formed on each of both vertex portions of the cut part, and in the electrode tab manufacturing step (S50), both the vertex portions of the cut part may be cut to be inclined with respect to the display part to manufacture the electrode tab.

The display hole may be formed to be inclined in both the vertex portions of the overlapping non-coating portions, and in the electrode tab manufacturing step (S50), both the vertex portions of the non-coating portions may be cut to be inclined along the display hole defined in the non-coating portion.

In the electrode tab manufacturing step (S50), the non-coating portions in addition to all the display part may be cut to be inclined so that the display parts do not remain on the electrode tab.

The method may further comprise, after the electrode tab manufacturing step (S50), a display part inspection step (S60) of inspecting whether the display parts remain on the electrode tab, wherein, in the display part inspection step (S60), the electrode tab is photographed, and a photographed image of the electrode and a previously input image are compared with each other to inspect whether the display parts remain on the electrode tab.

The method may further comprise, after the display part inspection step (S60), an uncut part reinforcement step (S65)

of bonding the uncut part of the bonding surface again to reinforce bonding force of the uncut part.

The method may further comprise, after the uncut part reinforcement step (S65), a tape attachment step (S67) of attaching a protective tape on the uncut part to protect the uncut part.

The method may further comprise, after the tape attachment step (S67), an electrode lead coupling step (S70) of coupling an electrode lead to the electrode tab; and a pouch accommodation step (S80) of accommodating the electrode assembly, to which the electrode lead is coupled, in a pouch to complete the secondary battery.

A secondary battery manufactured by the method for manufacturing the secondary battery comprises: an electrode assembly in which electrodes, each of which is provided with a coating portion coated with an electrode active material and an electrode tab that is not coated with the electrode active material, and separators are alternately stacked, wherein the electrodes are stacked so that the electrode tabs overlap each other, wherein the overlapping electrode tabs comprise a connection surface connected to the coating portion and a bonding surface extending from the connection surface, and the bonding surface comprises an uncut part connected to the connection surface and a cut part which extends from the uncut part and of which both vertex portions are provided as inclined surfaces. The secondary battery may also include an electrode lead coupled to a central region of each of the electrode tabs along a longitudinal centerline of the electrode assembly, the central region extending laterally from the longitudinal centerline to longitudinal boundaries spaced apart from side surfaces of the electrode tabs. A protective tape may be attached to each of the side surfaces of the electrode tabs at each of the uncut parts and not extending beyond the longitudinal boundaries into the central region of the electrode tabs.

Advantageous Effects

First: the method for manufacturing the secondary battery according to the present invention may comprise the electrode preparation step, the electrode assembly manufacturing step, the non-coating portion bonding step, the display part formation step, and the electrode tab manufacturing step. Due to these features, the notching process for forming the electrode tab when the electrode is manufactured may be omitted to increase in simplification of the process, and particularly, the non-coating portion may be cut with respect to the display part to obtain the cutting accuracy and the uniform cutting force, thereby continuously manufacturing the electrode assembly having the uniform quality.

Second: in the method for manufacturing the secondary battery according to the present invention, the display part formation step may comprise the photographing process, the inspection process, and the display process. Due to these features, the display part may be disposed at the same position on the surface of the non-coating portion to obtain the cutting accuracy and the uniform cutting force.

Third: in the method for manufacturing the secondary battery according to the present invention, the display part may be formed on both the vertex portions of the non-coating portion with respect to the display part may be cut to be inclined. Due to this feature, the area of the electrode tab may be maximally secured.

Fourth: in the method for manufacturing the secondary battery according to the present invention, the uncut part of the bonding surface of the bonded non-coating portion may be provided. Due to this feature, the bonding force of the portion of the binding surface connected to the connection surface of the non-coating portion may be stably secured.

Fifth: in the method for manufacturing the secondary battery according to the present invention, the display part may be cut when the electrode tab is manufactured. Due to this feature, the display part may not remain on the electrode tab, and thus, the damage due to the display part remaining on the electrode tab may be previously prevented.

Sixth: in the method for manufacturing the secondary battery according to the present invention, after the cut part of the non-coating portion is cut to manufacture the electrode tab, the uncut part may be bonded again. Due to this feature, the bonding force of the uncut part may be reinforced. That is, when cutting the cut portion, the bonding force of the uncut part may be weakened. Accordingly, the uncut part may be bonded again to reinforce the bonding force of the uncut part.

Seventh: in the method for manufacturing the secondary battery according to the present invention, the protective tape may be attached to the uncut part. Due to this feature, the bonding force of the uncut part may be prevented from being weakened by the external impact.

BRIEF DESCRIPTION OF THE DRAWINGS

FIGS. 7 to 14 are process views illustrating the method for manufacturing the electrode assembly according to the first embodiment of the present invention, wherein FIG. 7 is a view illustrating an electrode manufacturing step, FIG. 8 is a view illustrating an electrode assembly manufacturing step, FIG. 9 is a view illustrating a non-coating portion bonding step, FIG. 10 is a view illustrating a display part formation step, FIG. 11 is a view illustrating an electrode tab manufacturing step, FIG. 12 is a view illustrating a tape attachment step, FIG. 13 is a view illustrating an electrode lead coupling step, and FIG. 14 is a view illustrating a pouch accommodation step.

MODE FOR CARRYING OUT THE INVENTION

Figure 1:
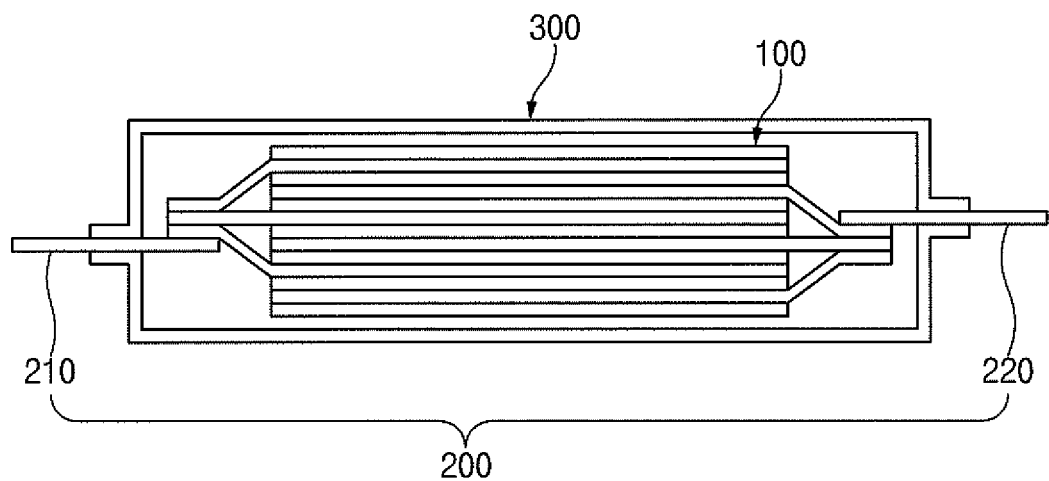
FIG. 1 is a cross-sectional view of a secondary battery according to a first embodiment of the present invention.
Figure 2:
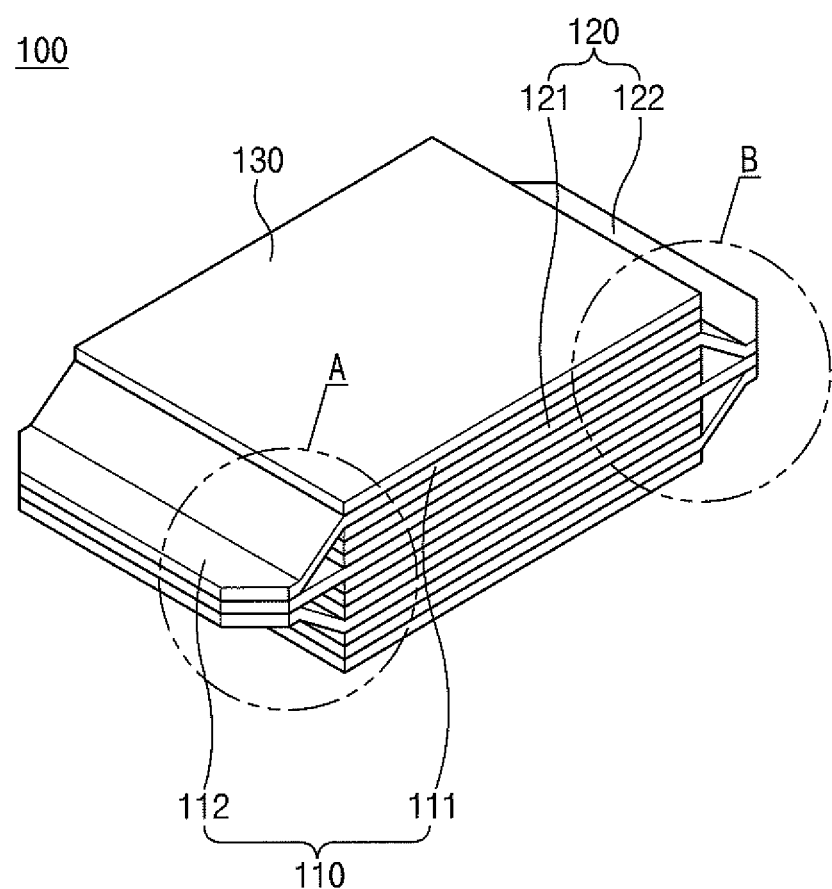
FIG. 2 is a perspective view of an electrode assembly according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment]

As illustrated in FIG. 1, a secondary battery according to a first embodiment of the present invention comprises an electrode assembly 100, an electrode lead 200 coupled to the electrode assembly 100, and a pouch 300 accommodating the electrode assembly 100 in a state in which a front end of the electrode lead 200 is pulled out to the outside.

Electrode Assembly

As illustrated in FIGS. 2 to 5, the electrode assembly 100 has a structure in which a plurality of electrodes and a plurality of separators are alternately stacked. Each of the electrodes comprises a coating portion coated with an electrode active material and an electrode tab that is a non-coating portion that is not coated with the electrode active material. Here, in the electrode assembly 100, the electrodes are stacked so that the electrode tabs overlap each other.

A plurality of electrodes comprise a first electrode 110 and a second electrode 120. The separator 130 is disposed between the first electrode 110 and the second electrode 120.

For example, in the electrode assembly 100, the first electrode 110 and the second electrode 120 are alternately stacked in the state in which the separator 130 is disposed therebetween. The first electrode 110 comprises a first coating portion coated with a first electrode active material and a first electrode tab 112 that is a non-coating portion that is not coated with the first electrode active material. Also, the second electrode 120 comprises a second coating portion 121 coated with a second electrode active material and a second electrode tab that is a non-coating portion that is not coated with the second electrode active material. Here, the first electrode tab 112 and the second electrode tab 122 are disposed to be pulled out toward both sides of the electrode assembly 100, respectively. That is, the first electrode tab 112 is disposed to be pulled out toward one end (a left end of the electrode assembly when viewed in FIG. 2) of the electrode assembly 100, and the second electrode tab 122 is disposed to be pulled out toward the other end (a right end of the electrode assembly when viewed in FIG. 2) of the electrode assembly 100.

The overlapping electrode tabs comprise a connection surface connected to the coating portion and a bonding surface extending from the connection surface, and the bonding surface comprises an uncut part connected to the connection surface and a cut part which extends from the uncut part and of which both vertex portions are provided as inclined surfaces.

Figure 3:
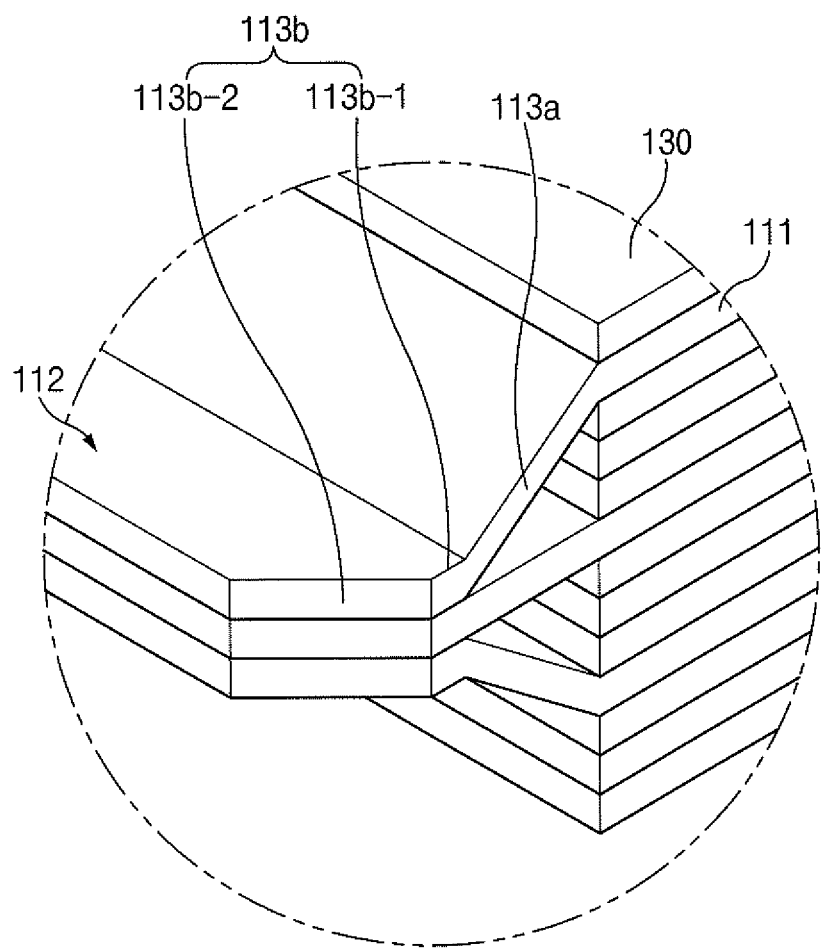
FIG. 3 is an enlarged view of a portion A illustrated in FIG. 2.
Figure 4:
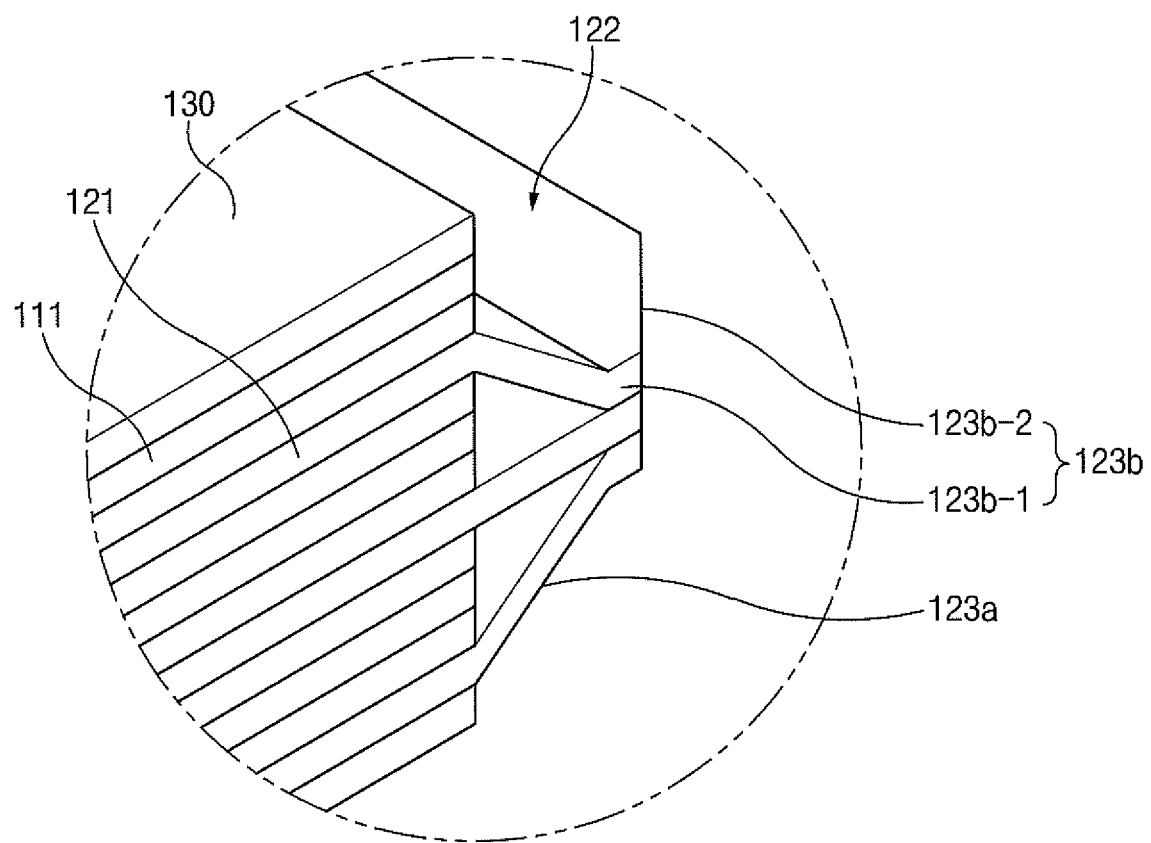
FIG. 4 is an enlarged view of a portion B illustrated in FIG. 2.
Figure 5:
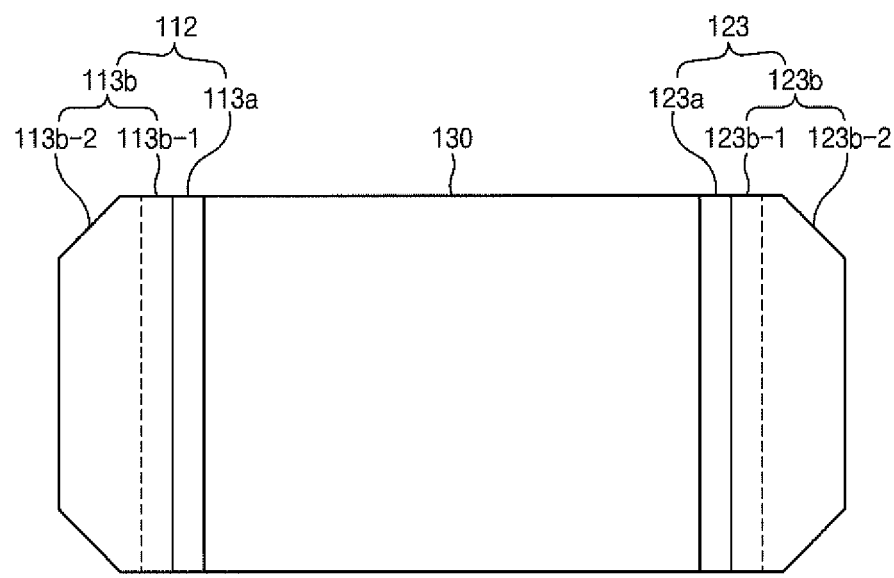
FIG. 5 is a plan view of FIG. 2.

For example, referring to FIG. 3, the overlapping first electrode tabs 112 comprise a first connection surface 113a connected to a first coating portion 111 and a first bonding surface 113b extending from the first connection surface 113a, and the first bonding surface 113b comprises a first uncut part 113b-1 connected to the first connection surface and a first cut part 113b-2 which extends from the first uncut part 113b-1 and of which both vertex portions are provided as inclined surfaces. Referring to FIG. 4, the overlapping second electrode tabs 122 comprise a second connection surface 123a connected to a second coating portion 121 and a second bonding surface 123b extending from the second connection surface 123a, and the second bonding surface 123b comprises a second uncut part 123b-1 connected to the second connection surface and a second cut part 123b-2 which extends from the second uncut part 123b-1 and of which both vertex portions are provided as inclined surfaces.

The electrode assembly 100 having the above-described structure comprises the first electrode tab 112 and the second electrode tab 122. Thus, since the first electrode tab 112 and the second electrode tab 122 are provided as the inclined surfaces having inclined angles on both side surfaces, respectively, an area of the electrode tab may be significantly secured, and resistance between the electrode tab and the electrode lead may be significantly reduced.

Each of the inclined surfaces has an inclination angle equal to or less than 45° when viewed with respect to a boundary between the electrode tab and the coating portion.

Electrode Lead

The electrode lead 200 is coupled to the electrode tab and comprises a first electrode lead 210 coupled to the first electrode tab 112 and a second electrode lead 220 coupled to the second electrode tab 122.

Here, the first electrode lead 210 is coupled to the first cut part 113b-2, and the second electrode lead 220 is coupled to the second cut part 123b-2. Thus, after the external force transmitted to the electrode lead is effectively dispersed by the cut parts 113b-2 and 123b-2, the external force may be transmitted to the uncut parts 113b-1 and 123b-1 to weaken the bonding force of each of the uncut parts 113b-1 and 123b-1.

Pouch

The pouch 300 is configured to accommodate the electrode assembly. That is the pouch 300 accommodates the electrode assembly 100 in a state in which a front end of the electrode lead 200 is pulled out to the outside.

Thus, the secondary battery according to the first embodiment of the present invention comprises the electrode assembly 100 provided with the electrode tab having a trapezoidal shape to significantly secure an area of the electrode tab.

Hereinafter, a method for manufacturing the secondary battery according to the first embodiment of the present invention will be described.

[Method for Manufacturing Secondary Battery According to First Embodiment]

Figure 6:
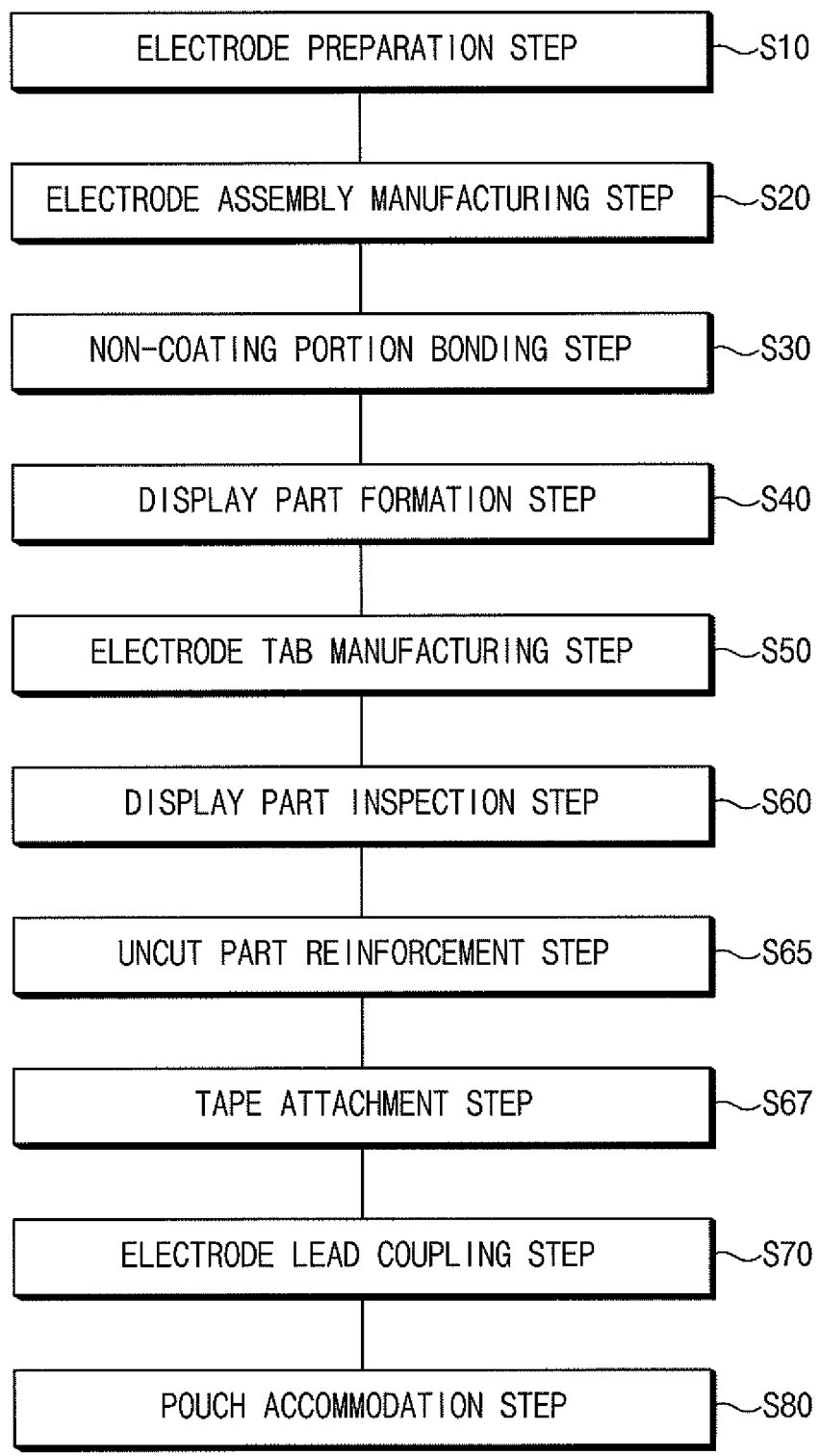
FIG. 6 is a flowchart illustrating a method for manufacturing the electrode assembly according to the first embodiment of the present invention.

As illustrated in FIG. 6, a method for manufacturing the secondary battery according to the first embodiment of the present invention comprises an electrode preparation step (S10), an electrode assembly manufacturing step (S20), a non-coating portion bonding step (S30), a display part formation step (S40), an electrode tab manufacturing step (S50), a display part inspection step (S60), an uncut part reinforcement step (S65), a tape attachment step (S67), an electrode lead coupling step (S70), and a pouch accommodation step (S80).

Electrode Preparation Step

Figure 7:
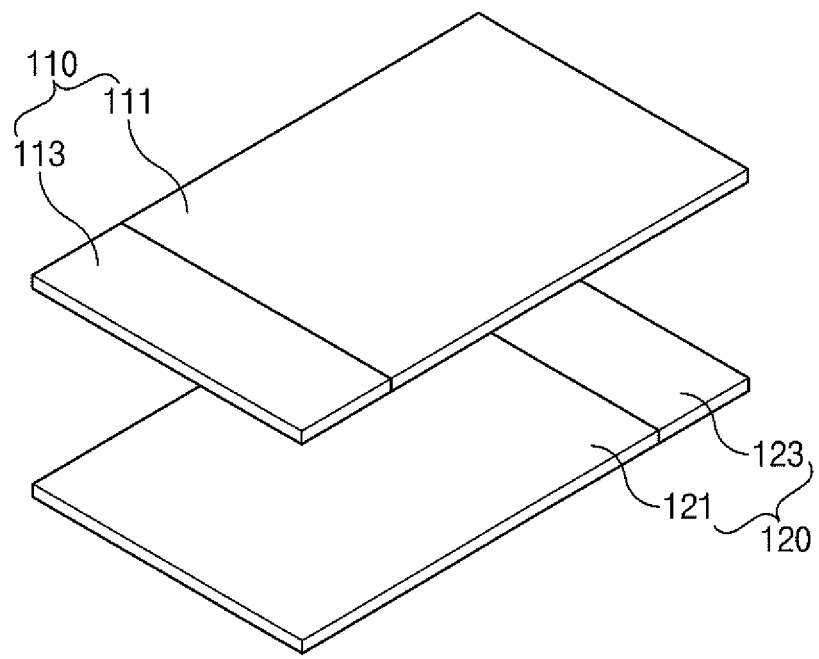

As illustrated in FIG. 7, in the electrode preparation step (S10), an electrode provided with a coating portion coated with an electrode active material and a non-coating portion that is not coated with the electrode active material is prepared. Here, the electrode comprises a first electrode 110 and a second electrode 120, which have different polarities.

That is, in the first electrode 110, a first electrode active material is applied to one side of a collector to form a first coating portion 111, and a first non-coating portion 113 is formed on the other side of the collector, which is not coated with the first electrode active material.

In the second electrode 120, a second electrode active material is applied to one side of the collector to form a second coating portion 121, and a second non-coating portion is formed on the other side of the collector, which is not coated with the second electrode active material.

Electrode Assembly Manufacturing Step

Figure 8:
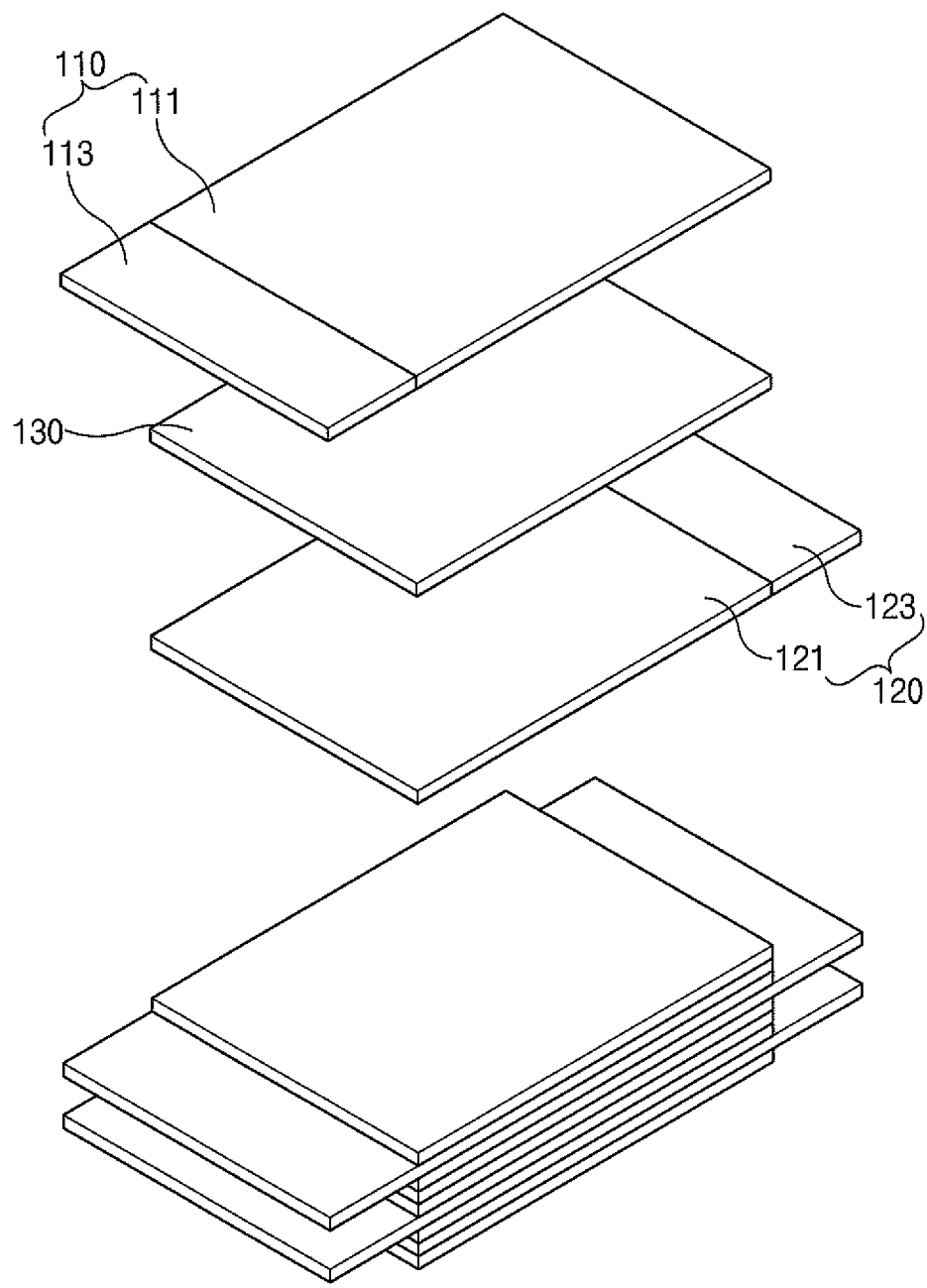

In the electrode assembly manufacturing step (S20), as illustrated in FIG. 8, electrodes and separators are alternately stacked to prepare an electrode assembly, and the electrodes are stacked so that non-coating portions overlap each other.

That is, in the electrode assembly manufacturing step (S20), the first electrode 110 and the second electrode 120 are alternately stacked with the separator 130 therebetween. Here, the first non-coating portion 113 of the first electrode 110 and the second non-coating portion 123 of the second electrode 120 are disposed to face different directions. For example, the first non-coating portion 113 of the first electrode 110 is disposed to be pulled out in a left direction of the electrode assembly 100 when viewed in FIG. 2, and the second non-coating portion 123 of the second electrode 120 is disposed to be pulled out in a right direction of the electrode assembly 100 when viewed in FIG. 2.

Non-Coating Portion Bonding Step

Figure 9:
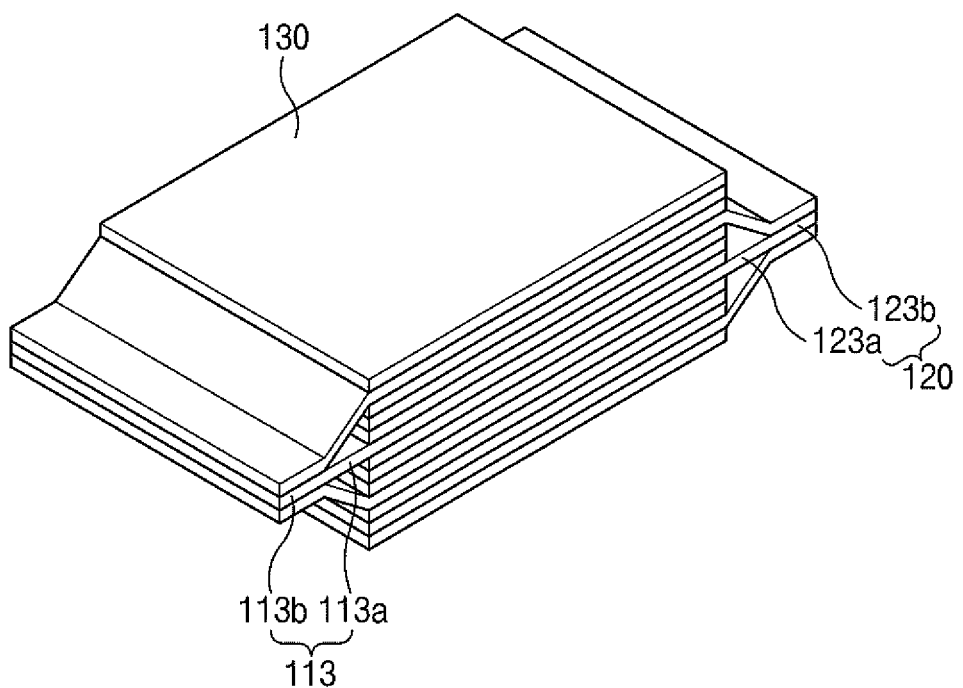

In the non-coating portion bonding step (S30), as illustrated in FIG. 9, the overlapping non-coating portions are welded to be integrated with each other. That is, in the non-coating portion bonding step (S30), the overlapped first non-coating portions 113 are welded to be integrated with each other, and the overlapping second non-coating portions 123 are welded to be integrated with each other.

As a result, the non-coating portion is provided with a connection surface connected to the coating portion and a bonding surface extending from the connection surface.

That is, the first non-coating portion 113 comprises a first connection surface 113a connected to the first coating portion 111 and a first bonding surface 113b extending from the first connection surface 113a. Here, only the first bonding surface 113b is welded.

The second non-coating portion 123 comprises a second connection surface 123a connected to the second coating portion 121 and a second bonding surface 123b extending from the second connection surface 123a. Here, only the second bonding surface 123b is welded.

Display Part Formation Step

Figure 10:
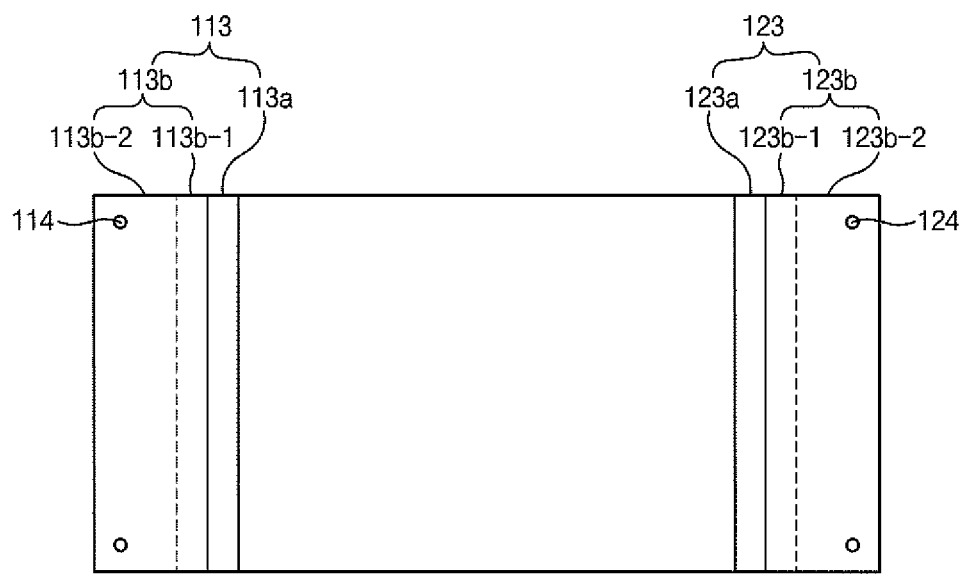

As illustrated in FIG. 10, the display part forming step (S40) is performed to form a display part for setting a cutting point on a surface of the overlapping non-coating portions and comprises a photographing process, an inspection process, and a display process.

In the photographing process, the surface of the overlapping non-coating portions are photographed. That is, in the photographing process, the first non-coating portion 113 is photographed to calculate an image of the first non-coating portion, and the overlapping second non-coating portion 123 is photographed to calculate an image of the second non-coating portion.

In the inspection process, whether the photographed image of the non-coating portion is within a preset range of a previously input image of the non-coating portion is inspected.

That is, in the inspection process, whether the photographed image of the first non-coating portion is within a preset range of a previously input image of the first non-coating portion is inspected. Then, when the photographed image is within the preset range of the previously input image, it is determined as a normal image, and when the photographed image is out of the preset range of the previously input image, it is determined as a defective image. Also, in the inspection process, whether the photographed image of the second non-coating portion is within a preset range of a previously input image of the second non-coating portion is inspected. Then, when the photographed image is within the preset range of the previously input image, it is determined as a normal image, and when the photographed image is out of the preset range of the previously input image, it is determined as a defective image.

In the display process, when the photographed image of the non-coating portion is within the preset range of the previously input image of the non-coating portion, a display part for setting a cutting point on the surface of the overlapping non-coating portions is formed.

That is, in the display process, when the photographed image of the first non-coating portion is within the preset range of the previously input image of the first non-coating portion, a display part 114 for setting a cutting point on a surface of the bonded first non-coating portion 113 is formed, and when the photographed image of the second non-coating portion is within the preset range of the previously input image of the second non-coating portion, a display part 124 for setting a cutting point on a surface of the bonded second non-coating portion 113 is formed.

The display part may be used as a reference point when manufacturing the electrode tab by cutting the non-coating portion to improve cutting accuracy and continuously manufacture the electrode tab having uniform quality.

Particularly, in the display process, the display part are formed on each of both vertex portions of the surface of the overlapping non-coating portions. That is, in the display process, the display part 114 for setting the cutting point on each of both the vertex portions on the surface of the overlapping first non-coating portions 113 is formed, and the display part 124 for setting the cutting point on each of both the vertex portions on the surface of the overlapping second non-coating portions 123 is formed.

The display part is formed as a display hole passing from a top surface to a bottom surface of the overlapping non-coating portions. That is, a display hole is formed to pass from a top surface to a bottom surface of the overlapping first non-coating portions 113, and a display hole is formed to pass from a top surface to a bottom surface of the overlapping second non-coating portions 123. Thus, the display part may be stably and conveniently formed on the surface of the non-coating portion.

In the display process, the bonding surface is divided into the uncut part connected to the connection surface and the cut part extending from the uncut part, and then, the display parts for setting the cutting points are respectively formed on both the vertex portions of the cut part.

That is, in the display process, a first bonding surface 113b of the first non-coating portion 113 is divided into a first uncut part 113b-1 connected to a first connection surface 113a and a first cut part 113b-2 extending from the first uncut part 113b-1, and then, the display part 114 for setting the cutting point is formed on each of both vertex portions of the first cut part 113b-2. Also, a second bonding surface 123b of the second non-coating portion 123 is divided into a second uncut part 123b-1 connected to a second connection surface 123a and a second cut part 123b-2 extending from the second uncut part 123b-1, and then, the display part 124 for setting the cutting point is formed on each of both vertex portions of the second cut part 123b-2.

Here, when the entire bonding surface is cut to be inclined, the bonding force of the bonding surface may be significantly weakened. In particular, the weakening of the bonding force may occur at a boundary between the connection surface and the bonding surface. In order to solve this problem, the uncut part that is not cut is formed on the bonding surface connected to the connection surface, and thus, the weakening of the bonding force between the connection surface and the bonding surface may be compensated.

Electrode Tab Manufacturing Step

Figure 11:
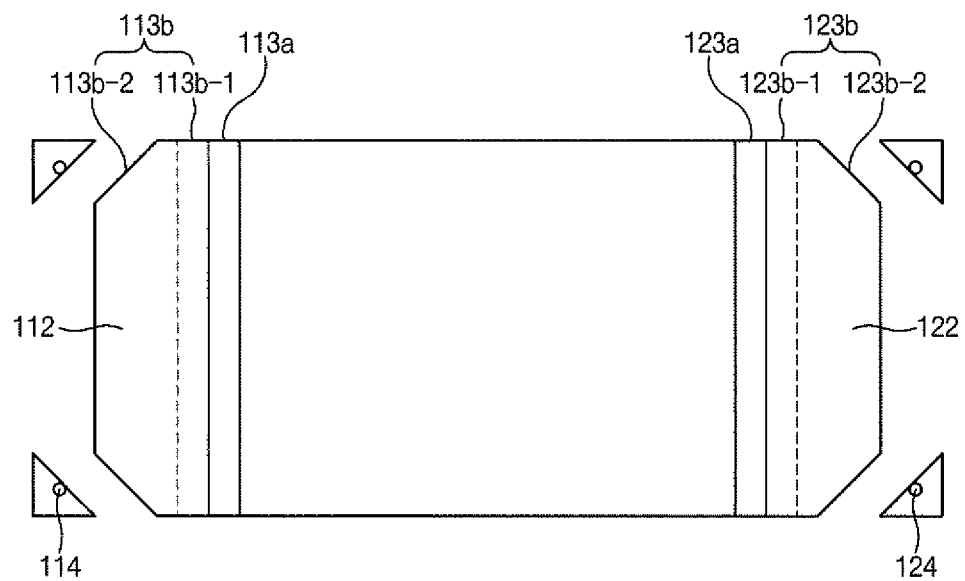

In the electrode tab manufacturing step (S50), as illustrated in FIG. 11, the electrode tab is manufactured by cutting the non-coating portion with respect to the display part. That is, in the electrode tab manufacturing step (S50), both vertexes of the first non-coating portion 113 are cut to be inclined with respect to the display part 114 to manufacture a first electrode tab 112. In addition, both vertexes of the second non-coating portion 123 are cut to be inclined with respect to the display part 124 to manufacture a second electrode tab 122.

Here, in the electrode tab manufacturing step (S50), both the vertex portions of the cut part except for the uncut part are cut to be inclined with respect to the display part to manufacture the electrode tab. That is, both the vertexes of the first cut part 113b-2 are cut to be inclined with respect to the display part 114 formed on the first cut part 113b-2 except for the first uncut part 113b-1, and both the vertexes of the second cut part 123b-2 are cut to be inclined with respect to the display part 114 formed on the second cut part 123b-2 except for the second uncut part 123b-1. Thus, the weakening of the bonding force of the electrode tab may be significantly prevented through the uncut part.

Particularly, in the electrode tab manufacturing step (S50), both the vertex portions of the non-coating portions that overlap each other in addition to all the display parts are cut to be inclined so that the display parts do not remain on the cut electrode tab. That is, when cutting the first non-coating portion 113, the first non-coating portion 113 is cut so that all the display parts 114 are removed, and when cutting the second non-coating portion 123, the second non-coating portion 123 is cut so that all the display parts 124 are removed. Thus, since the display part is not formed on the first and second electrode tabs 112 and 122, quality may be improved. In particular, the non-coating portions of the electrodes are cut at once to significantly reduce a cutting time.

Display Part Inspection Step

The display part inspection step S60 is performed for inspecting whether the display part remains on the electrode tab. That is, whether the display part remains on the electrode tab is inspected by comparing a photographed image of the electrode tab with a previously input image of the electrode tab.

That is, in the display part inspection step (S60), the first electrode tab 112 is photographed to inspect whether the display part remains on the first electrode tab by comparing the photographed image of the first electrode tab with the previously input image. Also, the second electrode tab 122 is photographed to inspect whether the display part remains on the second electrode tab by comparing the photographed image of the second electrode tab with the previously input image.

Uncut Part Reinforcement Step

In the uncut part reinforcement step (S65), the uncut part of the bonding surface is bonded again to reinforce the bonding force of the uncut part. That is, in the uncut part reinforcement step (S65), the cut part may be cut to weaken the bonding force of the uncut part. As a result, the uncut part may be bonded again to reinforce the bonding force of the uncut part.

In the uncut part reinforcement step (S65), the uncut part 113b-1 of the first bonding surface 113b is compressed to reinforce the bonding force, and the uncut part 123b-1 of the second bonding surface 123b is compressed to reinforce the bonding force.

Tape Attachment Step

Figure 12:
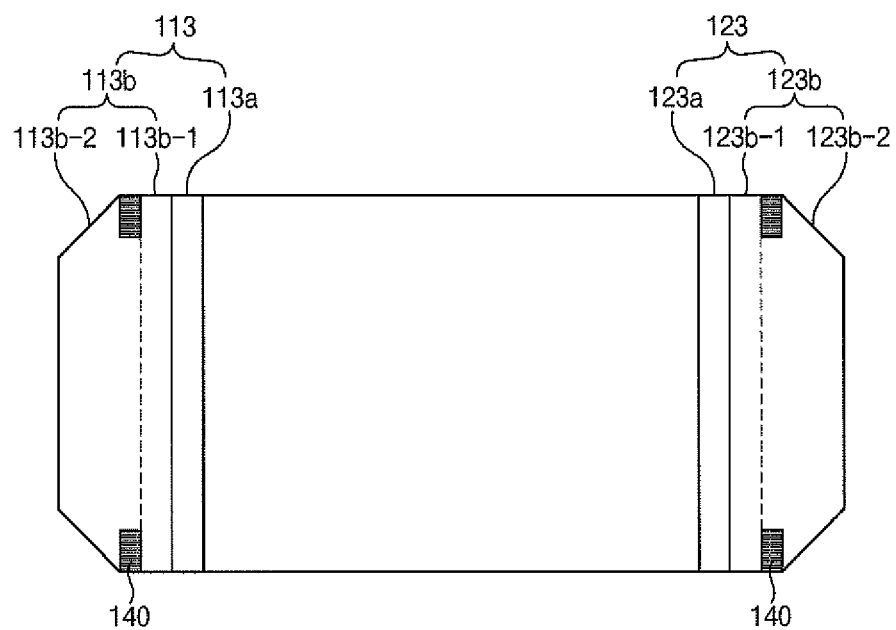

In the tape attachment step (S67), as illustrated in FIG. 12, a protective table is attached to the uncut part to protect the uncut part after the uncut part reinforcement step (s65). That is, a protective tape 140 is attached to each of both side surfaces of each of the uncut parts 113b-1 and 123b-1. Thus, the first bonding surface 113b and the second bonding surface 123b may be protected against an external impact to prevent the bonding force of the first bonding surface 113b and the second bonding surface 123b from being weakened.

Electrode Lead Coupling Step

Figure 13:
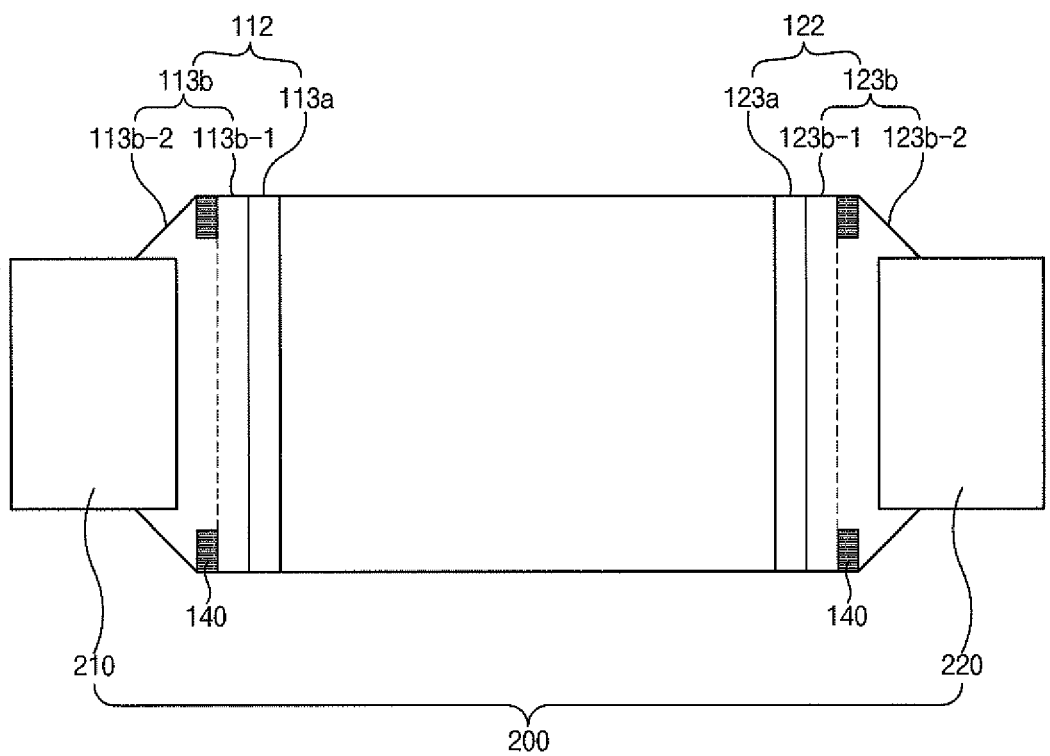

In the electrode lead coupling step (S70), as illustrated in FIG. 13, an electrode lead 200 is coupled to the electrode tab. Here, the electrode lead 200 comprises a first electrode lead 210 and a second electrode lead 220.

That is, in the electrode lead coupling step (S70), the first electrode lead 210 is welded and coupled to the first electrode tab 112, and the second electrode lead 220 is welded and coupled to the second electrode tab 122.

Here, the electrode lead is coupled to the cut part to prevent the bonding force of the uncut part from being weakened.

Pouch Accommodation Step

Figure 14:
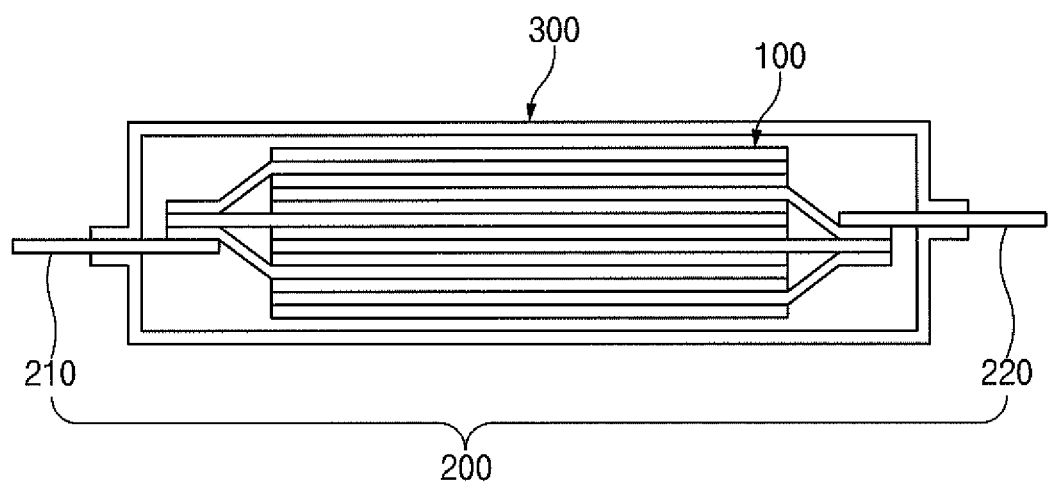

In the pouch accommodation step (S80), as illustrated in FIG. 14, an electrode assembly to which the electrode lead is coupled is accommodated in a pouch 300 to complete the secondary battery.

Therefore, in the method for manufacturing the secondary battery according to the first embodiment of the present invention, the notching process for forming the electrode tab may be omitted to simplify the process. Particularly, the overlapping non-coating portions may be cut at once through the display part to form the electrode tab, thereby improving the cutting accuracy and continuously manufacturing the electrode tab having the uniform quality.

Hereinafter, in descriptions of another embodiment of the present invention, constituents having the same function as the above-mentioned embodiment have been given the same reference numeral in the drawings, and thus duplicated description will be omitted.

[Method for Manufacturing Secondary Battery According to Second Embodiment]

Figure 15:
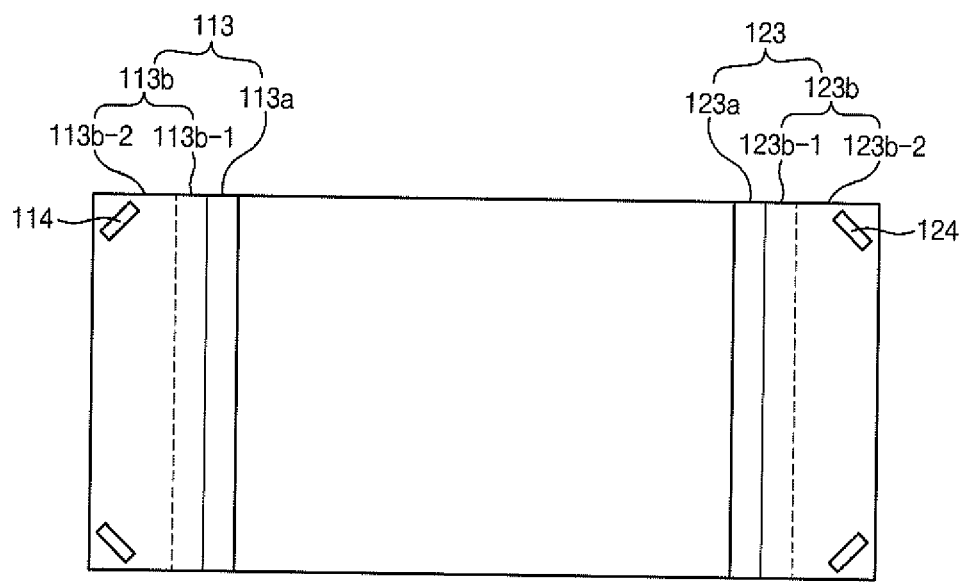
FIG. 15 is a plan view of a secondary battery according to a second embodiment of the present invention.

In a method for manufacturing a secondary battery according to a second embodiment of the present invention, as illustrated in FIG. 15, a display hole that is a display part is defined to be inclined in each of both vertex portions of the overlapping non-coating portions in a display part formation step (S40) of forming the display part for setting a cutting point on a surface of the bonded non-coating portion, and both the vertex portions of the non-coating portion are cut to be inclined along the display hole formed in the non-coating portion in the electrode tab manufacturing step (S50).

That is, in the display part formation step (S40), a display hole 514 is formed lengthily in the same direction as a direction, in which a first non-coating portion 113 is cut, at both vertex portions on a surface of the first non-coating portion 113, and a display hole 624 is formed lengthily in the same direction as a direction, in which a second non-coating portion 123 is cut, at both vertex portions on a surface of the second non-coating portion 123.

Thus, when cutting the non-coating portion, since the non-coating portion is cut based on the display holes, the non-coating portion may be easily cut to improve cutting direction and accuracy.

Each of the display holes 514 and 624 may have a rectangular shape. Thus, when cutting the non-coating portion, the non-coating portion may be easily cut so that the display holes do not remain.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising:
- an electrode preparation step of preparing electrodes, each of which is provided with a coating portion coated with an electrode active material and a non-coating portion that is not coated with the electrode active material;
- an electrode assembly manufacturing step of alternately stacking the electrodes and separators to manufacture an electrode assembly, wherein the electrodes are stacked so that the non-coating portions overlap each other;
- a non-coating portion bonding step of bonding the non-coating portions to each other;
- a display part formation step of forming a display part for setting a cutting point on a surface of the bonded non-coating portion of each of the electrodes; and
- an electrode tab manufacturing step of cutting the bonded non-coating portion adjacent to the display part to manufacture an electrode tab,
- wherein the display part formation step comprises:
  - a photographing process of photographing the surface of the non-coating portions;
  - an inspection process of inspecting whether a photographed image of the non-coating portions is within a set range of a previously input image of the non-coating portions; and
  - a display process of forming the display part for setting the cutting point on the surface of the bonded non-coating portions when the photographed image of the non-coating portions is within the set range of the previously input image of the non-coating portions.

2. The method of claim 1, wherein, in the display process, the display part for setting the cutting point is formed on each of two vertex portions on the surface of each of the non-coating portions, and
in the electrode tab manufacturing step, the two vertex portions of each of the non-coating portions are cut at an inclined angle adjacent to the display part to manufacture the electrode tab.

3. The method of claim 2, wherein the display part is formed as a display hole passing from a top surface to a bottom surface of each of the non-coating portions.

4. The method of claim 3, wherein each of the non-coating portions comprises a connection surface connected to the respective coating portion and a bonding surface extending from the connection surface,
in the non-coating bonding step, the non-coating portions are bonded to each other at the respective bonding surfaces,
in the display process, the bonding surface of each of the non-coating portions is divided into an uncut part connected to the connection surface and a cut part extending from the uncut part and having the two vertex portions, and the display part for setting the cutting point is formed on each of the two vertex portions, and
in the electrode tab manufacturing step, the two vertex portions of the cut part of each of the non-coating portions are cut at the inclined angle adjacent to the display part to manufacture the electrode tab.

5. The method of claim 4, wherein the display hole of each of the non-coating portions is formed at the inclined angle in each of the two vertex portions of the non-coating portions, and
in the electrode tab manufacturing step, the two vertex portions of each of the non-coating portions are cut at the inclined angle along the display hole defined in the non-coating portion.

6. The method of claim 5, wherein, in the electrode tab manufacturing step, the non-coating portions are cut so that the display parts do not remain on the respective electrode tab.

7. The method of claim 5, further comprising, after the electrode tab manufacturing step, a display part inspection step of inspecting whether each of the display parts remains on the respective electrode tab,
wherein, in the display part inspection step, each electrode tab is photographed, and the photographed image of the non-coating portions and a previously input image of the non-coating portions are compared with each other to inspect whether the display parts remain on the respective electrode tab.

8. The method of claim 7, further comprising, after the display part inspection step, an uncut part reinforcement step of bonding the uncut part of the bonding surface of each of the non-coating portions again to reinforce a bonding force of the uncut parts.

9. The method of claim 8, further comprising, after the uncut part reinforcement step, a tape attachment step of attaching a protective tape on each of the uncut parts to protect the uncut parts.

10. The method of claim 9, further comprising, after the tape attachment step;
- an electrode lead coupling step of coupling an electrode lead to the electrode tab; and
- a pouch accommodation step of accommodating the electrode assembly, to which the electrode lead is coupled, in a pouch to complete the secondary battery.

11. A secondary battery comprising:
- an electrode assembly in which electrodes, each of which is provided with a coating portion coated with an electrode active material and an electrode tab that is not coated with the electrode active material, and separators are alternately stacked, wherein the electrodes are stacked so that electrode tabs thereof overlap each other; and
- an electrode lead coupled to a central region of each of the electrode tabs along a longitudinal centerline of the electrode assembly, the central region extending laterally from the longitudinal centerline to longitudinal boundaries spaced apart from side surfaces of the electrode tabs,
- wherein the electrode tabs each comprise a connection surface connected to the respective coating portion and a bonding surface extending from the connection surface, and
- each bonding surface comprises an uncut part connected to the respective connection surface and a cut part which extends from the uncut part and of which two vertex portions are provided as inclined surfaces, and wherein a protective tape is attached to each of the side surfaces of the electrode tabs at each of the uncut parts and not extending beyond the longitudinal boundaries into the central region of the electrode tabs.

* * * * *